(12) United States Patent
Wang et al.

(10) Patent No.: US 9,792,534 B2
(45) Date of Patent: *Oct. 17, 2017

(54) SEMANTIC NATURAL LANGUAGE VECTOR SPACE

(71) Applicant: Adobe Systems Incorporated, San Jose, CA (US)

(72) Inventors: Zhaowen Wang, San Jose, CA (US); Quanzeng You, Rochester, NY (US); Hailin Jin, San Jose, CA (US); Chen Fang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,042

(22) Filed: Jan. 13, 2016

(65) Prior Publication Data

US 2017/0200066 A1 Jul. 13, 2017

(51) Int. Cl.
*G06K 9/00* (2006.01)
*G06K 9/62* (2006.01)
(Continued)

(52) U.S. Cl.
CPC ....... *G06K 9/6269* (2013.01); *G06F 17/3028* (2013.01); *G06F 17/30253* (2013.01);
(Continued)

(58) Field of Classification Search
CPC .......... G06K 9/66; G06K 9/4628; G06K 9/32; G06K 9/2013; G06K 9/344; G06K 9/6269
See application file for complete search history.

(56) References Cited

U.S. PATENT DOCUMENTS 6,374,217 B1 * 4/2002 Bellegarda .......... G10L 15/1815
704/240
9,280,709 B2 * 3/2016 Suzuki ............... G06K 9/00718
(Continued)

FOREIGN PATENT DOCUMENTS

CN 104572940 4/2015
CN 105389326 3/2016
(Continued)

OTHER PUBLICATIONS

"Pre-Interview Communication", U.S. Appl. No. 14/995,032, Feb. 15, 2017, 3 pages.
(Continued)

*Primary Examiner* — Amir Alavi
(74) *Attorney, Agent, or Firm* — Wolfe-SBMC

(57) ABSTRACT

Techniques for image captioning with word vector representations are described. In implementations, instead of outputting results of caption analysis directly, the framework is adapted to output points in a semantic word vector space. These word vector representations reflect distance values in the context of the semantic word vector space. In this approach, words are mapped into a vector space and the results of caption analysis are expressed as points in the vector space that capture semantics between words. In the vector space, similar concepts with have small distance values. The word vectors are not tied to particular words or a single dictionary. A post-processing step is employed to map the points to words and convert the word vector representations to captions. Accordingly, conversion is delayed to a later stage in the process.

20 Claims, 12 Drawing Sheets

(51) Int. Cl.
*G06K 9/46* (2006.01)
*G06F 17/30* (2006.01)
*G06N 3/08* (2006.01)

(52) U.S. Cl.
CPC ......... *G06K 9/4604* (2013.01); *G06K 9/6202* (2013.01); *G06N 3/08* (2013.01)

(56) References Cited

U.S. PATENT DOCUMENTS

| | | | | |
|---|---|---|---|---|
| 2003/0103675 | A1* | 6/2003 | Endo | G06F 17/30265 382/229 |
| 2003/0217066 | A1* | 11/2003 | Kayahara | G06F 17/30675 |
| 2009/0028445 | A1 | 1/2009 | Wu et al. | |
| 2010/0272411 | A1* | 10/2010 | Shiitani | G06K 9/00751 386/343 |
| 2012/0197825 | A1* | 8/2012 | Medlock | G06N 3/084 706/11 |
| 2016/0256690 | A1* | 9/2016 | Cecchi | A61N 1/36132 |
| 2017/0011279 | A1* | 1/2017 | Soldevila | G06K 9/66 |
| 2017/0200065 | A1 | 7/2017 | Wang et al. | |

FOREIGN PATENT DOCUMENTS

| | | |
|---|---|---|
| KR | 20090112020 | 10/2009 |
| WO | WO-2016070098 | 5/2016 |

OTHER PUBLICATIONS

"Combined Search and Examination Report", GB Application No. 1618932.6, Apr. 11, 2017, 7 pages.

Xi, "Image caption automatic generation method based on weighted feature", International Conference on Control, Automation and Systems (ICCAS), 2013.

"Combined Search and Examination Report", GB Application No. 1618936.7, May 2, 2017, 9 pages.

"Notice of Allowance", U.S. Appl. No. 14/995,032, dated Jul. 5, 2017, 9 pages.

* cited by examiner

SEMANTIC NATURAL LANGUAGE VECTOR SPACE

BACKGROUND

Automatically generating natural language descriptions of images has attracted increasing interest due to practical applications for image searching, accessibility of visually impaired people, and management of image collections. Conventional techniques for image processing do not support high precision natural language captioning and image searching due to limitations of conventional image tagging and search algorithms. This is because conventional techniques merely associate tags with the images, but do not define relationships between the tags nor with the image itself. Moreover, conventional techniques may involve using a top-down approach in which an overall "gist" of an image is first derived and then refined into appropriate descriptive words and captions through language modeling and sentence generation. This top-down approach, though, does not do a good job of capturing fine details of images such as local objects, attributes, and regions that contribute to precise descriptions for the images. As such, it may be difficult using conventional techniques to generate precise and complex image captions, such as "a man feeding a baby in a high chair with the baby holding a toy." Consequently, captions generated using the conventional techniques may omit important image details, which makes it difficult for users to search for specific images and fully understand the content of an image based on associated captions.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for image captioning with word vector representations are described herein. In or more implementations, instead of outputting results of caption analysis directly as words or sequences of words (e.g., the caption or sentence), the framework is adapted to output points in a semantic word vector space. These points constitute the word vector representations, which reflect distance values in the context of the semantic word vector space. In this approach, words are mapped into a vector space and the results of caption analysis are expressed as points in the vector space that capture semantics between words. In the vector space, similar concepts with have small distance values in word vector representations of the concepts. These points are not tied to particular words or a single dictionary. A post-processing step is employed to map the points to words and convert the word vector representations to captions. Accordingly, conversion is delayed to a later stage in the process. A result of this is that the dictionary can be changed late in the process to select a different language, use a different word scope or number of words, introduce novel terms, and so forth. Additionally, the word vector representations can be saved and steps completed prior to the post-processing do not have to be repeated if a change is made to the dictionary.

In implementations, the image captioning framework is based on neural network and machine learning. Given the target image, feature extraction techniques are applied to derive global image concepts that describe the "gist" of the image. For example, a pre-trained convolution neural network (CNN) may be used to encode the image with global descriptive terms. The CNN produces a visual feature vector that reflects the global image concepts. Information derived regarding the global image concepts is then fed into a language processing model that operates to probabilistically generate a descriptive caption of the image. For instance, the visual feature vector may be fed into a recurrent neural network (RNN) designed to implement language modeling and sentence generation techniques. The RNN is designed to iteratively predict a sequence of words to combine as a caption for the target image based upon probability distributions computed in accordance with weight factors in multiple iterations. In this context, an objective function implemented by the RNN may be adapted to consider distances in the semantic word vector space instead of probability distributions for word sequences, which enables the word vector representations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
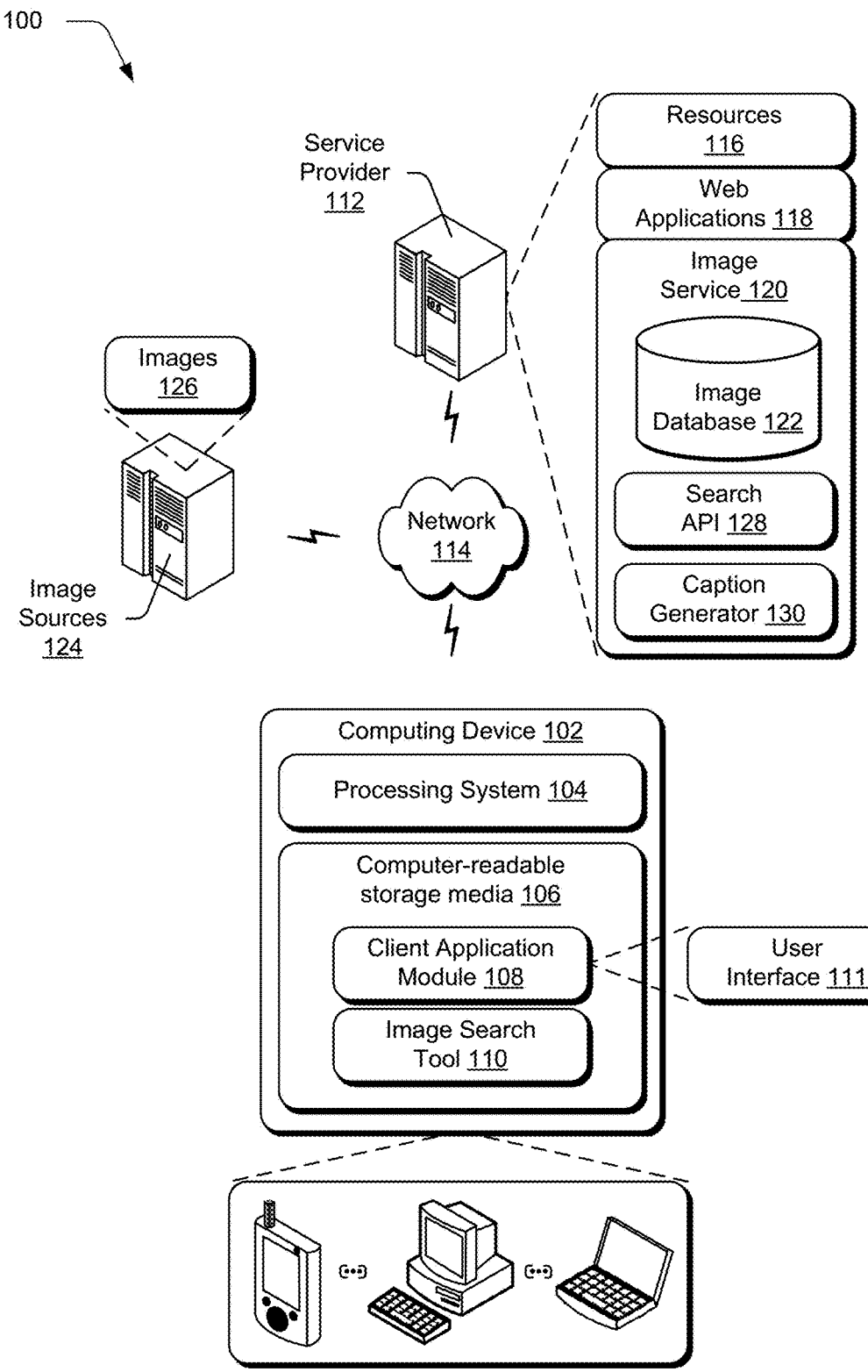
FIG. 1 is an illustration of an environment in an example implementation that is operable to employ techniques described herein.

Conventional techniques for image processing do not support high precision natural language captioning and image searching due to limitations of conventional image tagging and search algorithms. This is because conventional techniques merely associate tags with the images, but do not define relationships between the tags nor with the image itself. Moreover, conventional techniques may involve using a top-down approach in which an overall "gist" of an image is first derived and the refined into appropriate descriptive words and captions through language modeling and sentence generation. This top-down approach, though, does not do a good job of capturing fine details of images such as local objects, attributes, and regions that contribute to precise descriptions for the images.

Techniques for image captioning with word vector representations are described herein. In or more implementations, instead of outputting results of caption analysis directly as words or sequences of words (e.g., the caption or sentence), the framework is adapted to output points in a semantic word vector space. These points constitute the word vector representations, which reflect distance values in the context of the semantic word vector space. In this approach, words are mapped into a vector space and the results of caption analysis are expressed as points in the vector space that capture semantics between words. In the vector space, similar concepts with have small distance values in word vector representations of the concepts. These points are not tied to particular words or a single dictionary. A post-processing step is employed to map the points to words and convert the word vector representations to captions.

In implementations, the image captioning framework is based on neural network and machine learning. Given the target image, feature extraction techniques are applied to derive global image concepts that describe the "gist" of the image. For example, a pre-trained convolution neural network (CNN) may be used to encode the image with global descriptive terms. The CNN produces a visual feature vector that reflects the global image concepts. Information derived regarding the global image concepts is then fed into a language processing model that operates to probabilistically generate a descriptive caption of the image. For instance, the visual feature vector may be fed into a recurrent neural network (RNN) designed to implement language modeling and sentence generation techniques. The RNN is designed to iteratively predict a sequence of words to combine as a caption for the target image based upon probability distributions computed in accordance with weight factors in multiple iterations. In this context, an objective function implemented by the RNN is adapted to consider distances in the semantic word vector space instead of probability distributions for word sequences, which enables the word vector representations Techniques for image captioning with word vector representations as described in this document enable flexible and efficient approaches to generating image captions Because captions are generated as word vector representations, conversion is delayed to post-processing in a later stage of the process. Consequently, a dictionary used for the analysis can be changed late in the process to select a different language, use a different word scope or number of words, introduce novel terms, and so forth. Additionally, the word vector representations can be saved and reused, and steps completed prior to the post-processing do not have to be repeated if a change is made to the dictionary.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of an image search tool 110 that represents functionality operable to implement techniques for image searches as described above and below. For instance, the image search tool 110 is operable to access and utilize various available sources of images to find candidate images that match query terms. The image search tool 110 further represents functionality to perform various actions to facilitate searches based on context of an image frame as discussed herein, such as analysis of content in the vicinity of an image frame, text analytics to derive query terms to use as search parameters, named entity recognition, and/or construction of queries, to name a few examples. Images that are discovered based on images searches conducted via the image search tool 110 may be exposed via a user interface 111 output by a client application module 108 or another application for which the image search tool 110 is configured to provide functionality for extrapolative stock image searches.

The image search tool 110 may be implemented as a software module, a hardware device, or using a combination of software, hardware, firmware, fixed logic circuitry, etc. The image search tool 110 may be implemented as a standalone component of the computing device 102 as illustrated. In addition or alternatively, the image search tool 110 may be configured as a component of the client application module 108, an operating system, or other device application. For example, image search tool 110 may be provided as a plug-in and/or downloadable script for a browser. The image search tool 110 may also represent script contained in or otherwise accessible via a webpage, web application, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 13.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. Web applications 118 may be operated over a network 114 using a browser or other client application module 108 to obtain and run client-side code for the web application. In at least some implementations, a runtime environment for execution of the web application 118 is provided by the browser (or other client application module 108). Thus, service and content available from the service provider may be accessible as web-applications in some scenarios.

The service provider is further illustrated as including an image service 120 that is configured to provide an image database 122 in accordance with techniques described herein. The image service 120 may operate to search different image sources 124 and analyze and curate images 126 that are available from the image sources to produce the image database 122. The image database 122 is representative of a server-side repository of curated images that may accessed by clients to insert into web pages, word documents, presentations, and other content. The image service 120, for example, may be configured to provide clients/applications access to utilize the image database 122 via respective image search tools 110. By way of example, the image service 120 is depicted as implementing a search application programming interface (search API) 128 though which clients/applications can provide search requests to define and initiate searches via the image service 120.

The image service 120 can additionally include a caption generator 130. The caption generator 130 represents functionality operable to implement image captioning techniques described above and below. Generally speaking, the caption generator 130 is designed to analyze images to generate natural language descriptions of the images, such as "a man riding a surfboard on top of a wave." In implementations, the caption generator 130 relies upon neural network and machine learning, details of which are discussed in relation to FIGS. 3 and 4 below. In implementations, a convolution neural network (CNN) may be used to encode the image with global descriptive terms, which are then fed into a recurrent neural network (RNN) designed to implement language modeling and sentence generation techniques. In accordance with inventive principles described in this document the caption generator 130 is configured to enhance the combination of CNN image features and RNN modeling for image captioning in multiple ways. By way of introduction, operation of the RNN for caption generation may be supplemented with image detail keywords derived from a weakly annotated image source(s) as discussed in relation to FIGS. 5 and 6 below. In addition or alternatively, the caption generator 130 may output representations of words in a vector word space instead of words directly as discussed in relation to FIGS. 7 and 8. Moreover, the caption generator 130 may be configured to apply a semantic attention model to select different keywords for different nodes in the RNN based on context, as discussed in relation to FIGS. 9-11.

Figure 2:
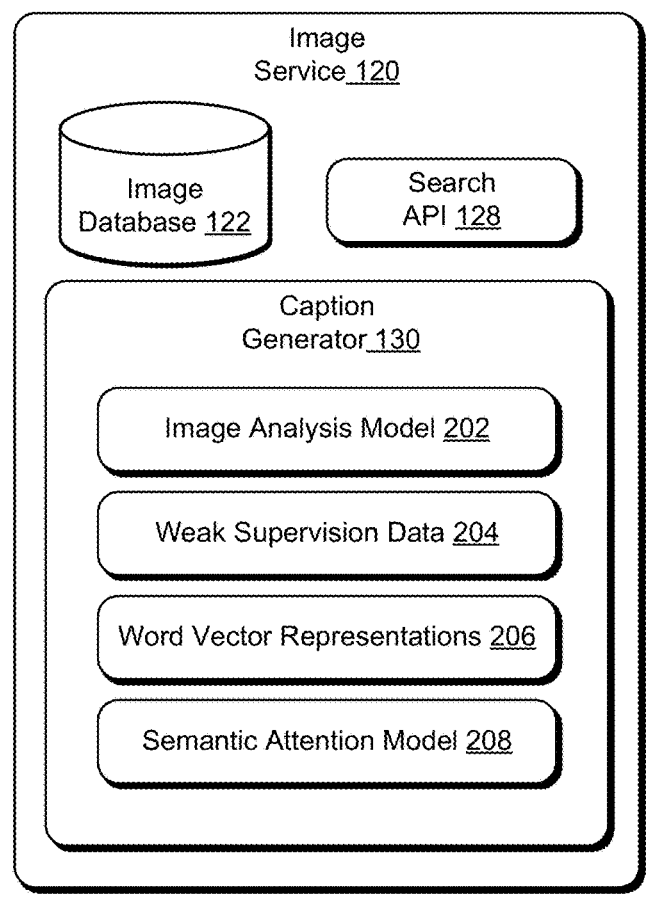
FIG. 2 depicts a diagram showing details of a caption generator in accordance with one or more implementations.

FIG. 2 depicts generally at 200 a diagram showing details of a caption generator 130 in accordance with one or more implementations. In this example, the caption generator 130 is implemented as a component of the image service 120. It is noted, that the caption generator 130 may be configured in other ways also, such as being a standalone service, a component of the image search tool 110, or a separate application deployed to clients, image sources, and/or other entities. The caption generator 130 is depicted as including an image analysis model 202. The image analysis model 202 represents functionality to process image in various ways including but not limited to feature extraction, metadata parsing, patch analysis, object detection, and so forth. The image analysis model 202 specifies algorithms and operations used to obtain relevant keywords and descriptions of images used for caption analysis. For instance, the image analysis model 202 may reflect definitions, processes, and parameters for the convolution neural network (CNN) and recurrent neural network (RNN) relied upon for image captioning. To enhance image captioning, the caption generator 130 is additionally configured to use weak supervision data 204, word vector representations 206, and/or a semantic attention model 208, individually or together in any combinations as discussed in greater detail below.

Having considered an example environment, consider now a discussion of some example details of techniques for image captioning in accordance with one or more implementations.

Image Captioning Implementation Details

This section describes some example details of image captioning with enhancements in accordance with one or more implementations. The details are discussed in relation to some example procedures, scenarios, and user interfaces of FIGS. 3-11. The procedures discussed herein are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to an image database 122 via an image service 120 or otherwise. Aspects of the procedures may also be performed by a suitably configured device, such as the example computing device 102 of FIG. 1 that includes or makes use of an image search tool 110 and/or a client application module 108.

In general, functionality, features, and concepts described in relation to the examples above and below may be employed in the context of the example procedures described in this document. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Image Captioning Framework

Figure 3:
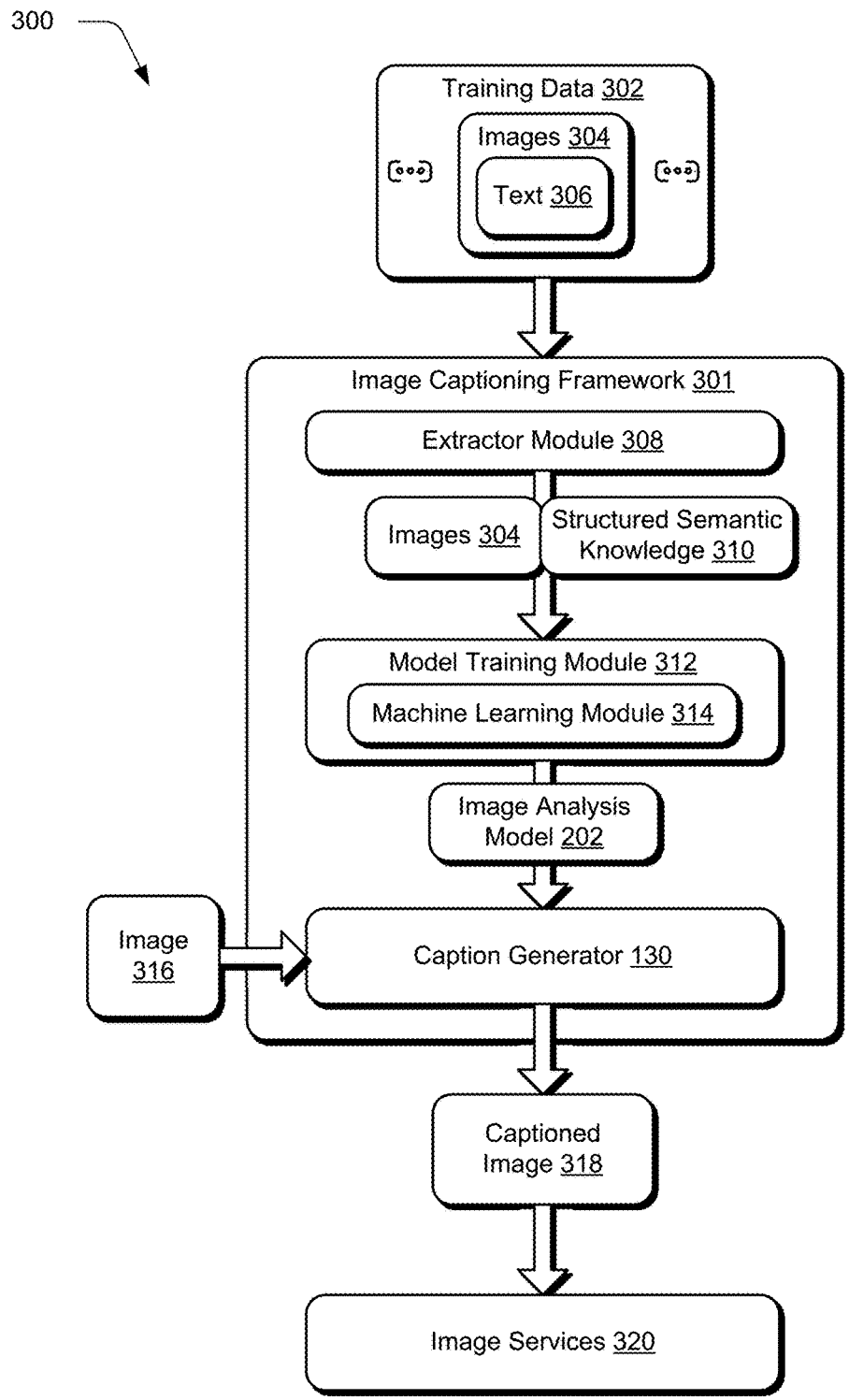
FIG. 3 depicts an example implementation of an image captioning framework accordance with one or more implementations.

FIG. 3 depicts generally at 300 an example implementation of an image captioning framework 301. In this example, the image captioning framework 301 employs a machine learning approach to generate a captioned image. Accordingly, training data 302 is obtained by the image captioning framework 301 that is to be used to train the model that is then used to form the caption. Techniques that are used to train models in similar scenarios (e.g., image understanding problems) may rely on users to manually tag the images to form the training data 302. The model may also be trained using machine learning using techniques that are performable automatically and without user intervention.

In the illustrated example, the training data 302 includes images 304 and associated text 306, such as captions or metadata associated with the images 304. An extractor module 308 is then used to extract structured semantic knowledge 310, e.g., "<Subject,Attribute>, Image" and "<Subject,Predicate,Object>, Image", using natural language processing. Extraction may also include localization of the structured semantic to objects or regions within the image. Structured semantic knowledge 310 may be used to match images to data associated with visually similar images (e.g., captioning), and also to find images that match a particular caption of set of metadata (e.g., searching).

The images 304 and corresponding structured semantic knowledge 310 are then passed to a model training module 312. The model training module 312 is illustrated as including a machine learning module 314 that is representative of functionality to employ machine learning (e.g., neural networks, convolutional neural networks, and so on) to train the image analysis model 202 using the images 304 and structured semantic knowledge 310. The model 316 is trained to define a relationship (e.g., visual feature vector) between text features included in the structured semantic knowledge 310 with image features in the images.

The image analysis model 202 is then used by a caption generator to process an input image 316 and generate a captioned image 318. The captioned image 318, for instance, may include text tags and descriptions to define concepts of the image 108, even in instances in which the input image 316 does include any text. Rather, the caption generator 130 used the image analysis model 202 to generate appropriate text descriptions based on analysis of the input image 316. The captioned image 318 may then be employed by images services 320 to control a variety of functionality, such as image searches, caption and metadata extraction, image cataloging, accessibility features and so on automatically and without user intervention.

In general, the image captioning framework 301 involves feature extraction followed by construction of a description based on the features. Various different models and approaches may be employed for both the feature extraction operations and description construction operations reflected by the image captioning framework 301. As noted previously, the image captioning framework 301 may rely upon neural network and machine learning. In implementations, feature extraction is implemented using a convolution neural network (CNN) and then a recurrent neural network (RNN) is invoked for language modeling and sentence construction.

Figure 4:
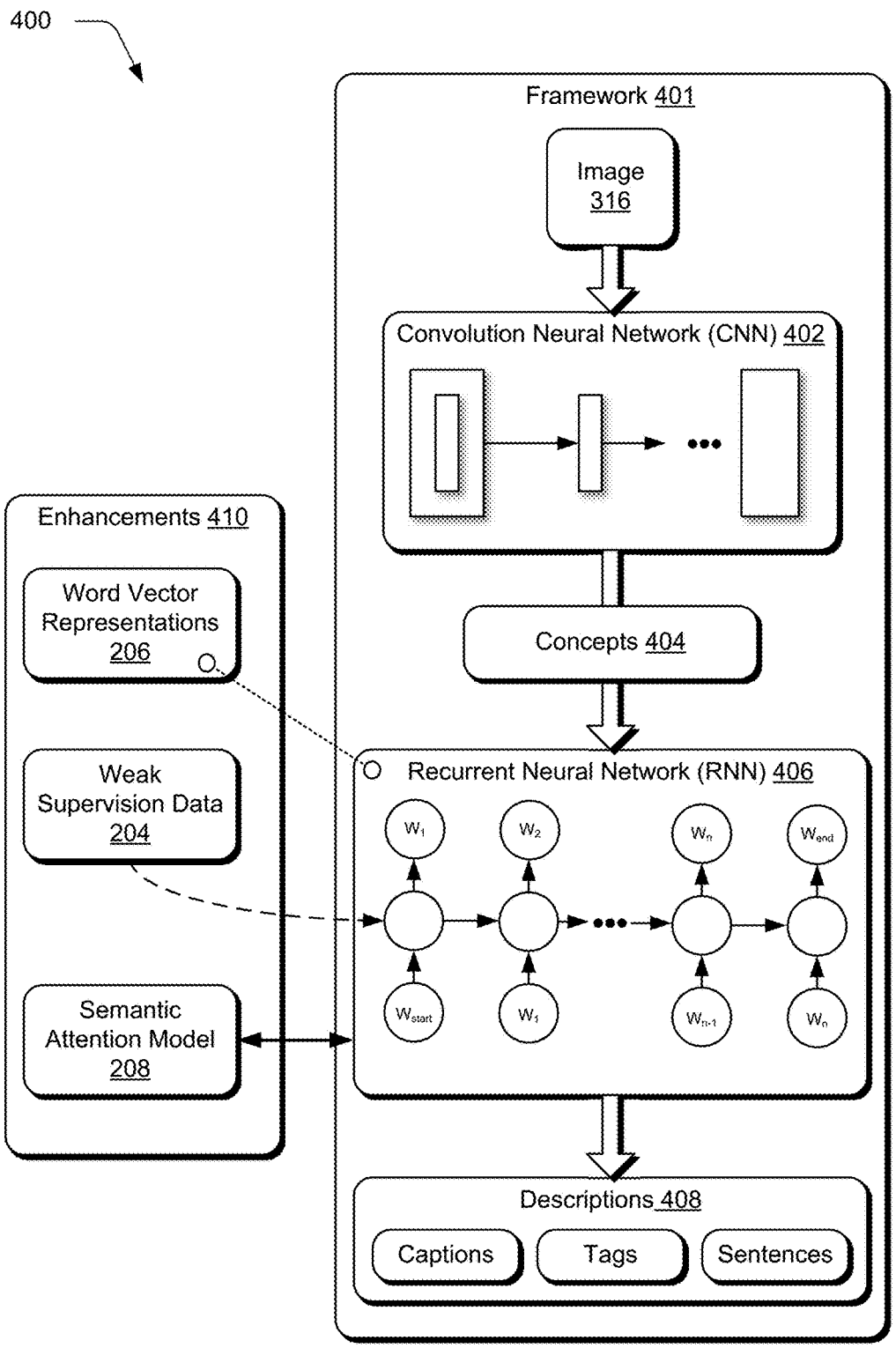
FIG. 4 is diagram depicting details of an image captioning framework in accordance with one or more implementations.

In this context, FIG. 4 is diagram depicting generally at 400 details of an image captioning framework in accordance with one or more implementations. Here, framework 401 represents a general encoder-decoder framework for neural network based image captioning. The framework is based on neural network and machine learning. Given a target image 316, feature extraction techniques are applied to derive global image concepts that describe the "gist" of the image. For example, a pre-trained convolution neural network (CNN) 402 is used to encode the image with concepts 404 that indicate the gist of the image as a whole. The CNN produces a visual feature vector that reflects these "global" concepts 404. Information derived regarding the global image concepts 404 is then fed into a language processing model that operates to probabilistically generate a descriptive caption of the image. For instance, the visual feature vector may be fed into a recurrent neural network (RNN) 406 designed to implement language modeling and sentence generation techniques. The RNN 406 is designed to iteratively predict a sequence of words to combine as a caption for the target image based upon probability distributions computed in accordance with weight factors in multiple iterations. As represented, the RNN 406 outputs descriptions 408 in the form of captions, tags, sentences and other text that is associated with the image 316. This produces a captioned image as discussed in relation to FIG. 3.

FIG. 4 further represents enhancements 410, which may be utilized in connection with the general framework 401. Specifically, a caption generator 130 may use weak supervision data 204, word vector representations 206, and/or a semantic attention model 208 as enhancements 410 to image captioning provided by the general framework 401. Each of the enhancements 410 may be used on an individual basis to supplement captioning of the general framework 401. Additionally, any combination of multiple enhancements 410 may be employed. Details regarding the enhancements 410 to the general framework 401 are discussed in turn below.

Weak Supervision

As noted previously, weak supervision data 204 regarding a target image may be obtained and utilized to provide detailed information that supplements global image concepts 404 derived for image captioning. In particular, the weak supervision data 204 is collected from sources of weakly annotated images, such as social networking sites, image sharing sites, and other online repositories for images. One or multiple sources may be relied upon for image captioning in different scenarios. Images uploaded to such sources are typically associated with tags, descriptions, and other text data added by users. This kind of text data added by users is considered "weakly supervised" because users may include "noisy" terms that may be irrelevant or marginally related to the image content and global concepts conveyed by the image, and the data is not refined or controlled by the service provider. The weak annotations provide detailed information regarding images at a deeper level of understanding than is attainable through traditional image recognition and feature extraction approaches. Consequently, the weak annotations are relied upon to generate a collection of keywords indicative of low-level image details (e.g., objects, attributes, regions, colloquial semantics), which can be used to expand the dictionary/vocabulary used for image analysis and supplement global image concepts 404 derived for image captioning.

In the general image captioning framework 401 discussed previously, a pre-trained convolutional neural network (CNN) is used to encode the image. The result is a visual feature vector which is fed into a recurrent neural network (RNN) for sentence generation. Training data are used to train the embedding function, the recurrent neural network and optionally the convolutional neural network. RNN is specially designed for sequential data. In RNN, each input node has a hidden state $h_i$, and for each hidden state, $h_i = f(x_i, h_{i-1})$ where $f(\bullet)$ is the activation function, such as logistic function or tan h function. In other words, the state for each node $h_i$ is dependent upon the activation function computed based on the input $x_i$ and the state for the preceding node $h_{i-1}$. In this way, RNN is used to iteratively compute the hidden state for each input node. Additionally, the hidden states propagate the interactions from the beginning of the sequences to the ending nodes in that sequence. The image captioning framework 401 can be integrated with various different architectures of RNN. Details regarding RNN architectures are omitted herein as implementations of different architectures will be appreciated by persons having ordinary skill in the art and the inventive concepts described herein do not depend upon the particular RNN architecture employed.

Figure 5:
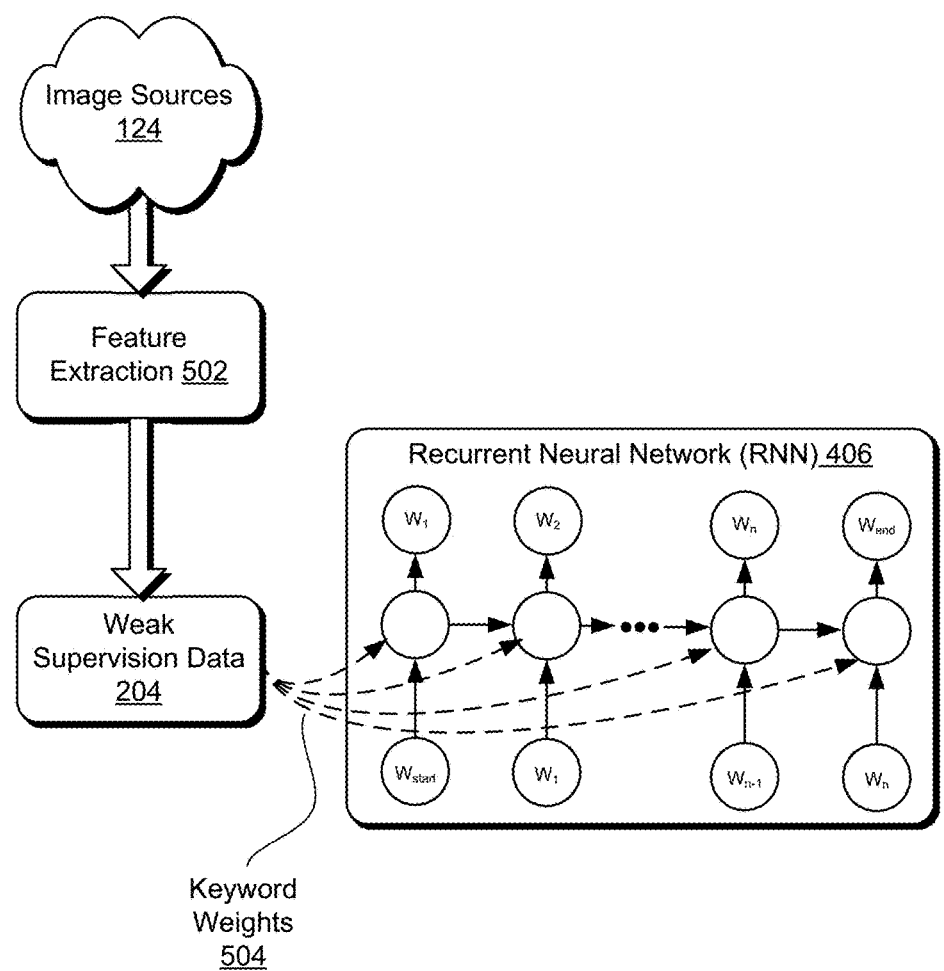
FIG. 5 depicts a diagram depicting a framework for image captioning with weak supervision accordance with one or more implementations.

In this context, FIG. 5 depicts generally at 500 a diagram depicting a framework for image captioning with weak supervision. In particular, FIG. 5 represents a scenario in which the RNN 406 in the general framework 401 of FIG. 4 is adapted to rely upon weak supervision data 204. The weak supervision data 204 may be obtained from various image sources 124 as described above and below. For example, a feature extraction 502 process may be applied to recognize images that are similar to a target image from at least one of the image sources 124. Images recognized as being similar to the target image are further processed to extract keywords from weak annotations associated with the similar images. Accordingly, the feature extraction 502 represents functionally applied to derive weak supervision data 204 in the form of a collection of keywords indicative of low-level image details as discussed above. The weak supervision data 204 is then supplied to the RNN 406 to inform the image captioning analysis as represented in FIG. 5. In one approach, a filtered list of keywords derived from weakly annotated images is supplied to the RNN. The list may be generated by scoring and ranking the keyword collection according to relevance criteria, and selecting a number of top ranking keywords to include in the filtered list. The filtered list may be filtered based on frequency, probability scores, weight factors or other relevance criteria. In implementations, the entire collection of keywords may be supplied for use in the RNN (e.g., an unfiltered list).

The list of keywords is configured to associate keyword weights 504 with each word or phrase. The keyword weights 504 reflect scores or probability distributions which may be used within the RNN to predict word sequences for captioning accordingly. As represented in FIG. 5, the list of top keywords may be fed into each node of the RNN as additional data that supplements global concepts. In this regard, the keyword list produced for a target image expands the vocabulary used to derive a caption for the target image. Additionally, the keyword weights 504 modulate weight factors applied by the RNN for language modeling and sentence construction. Consequently, the keyword weights 504 are effective to changes word probabilities used for probabilistic categorization implemented by the RNN to favor keywords indicative of low-level image details.

The effect of the keyword weights 504 for weak supervision data 204 can be expressed in terms of the general form $h_i = f(x_i, h_{i-1})$ for the RNN noted above. In general, given a collection of keywords $K_i = \{k_1, k_2, \ldots, k_K\}$ for each image $v_i$, the goal is how to employ $K_i$ to generate captions for $v_i$. Specifically, a model is built to use the keywords for both the training and testing stages. To do so, keywords are extracted for each image and aggregated as the collection of keywords. Then, each input node in the RNN is appended with additional embedding information for the keywords according to the equation $K_e = \max(W_k K + b)$. Here, $K_e$ is the keyword list for the node, $W_k$ is the embedding matrix for the keywords that controls the keyword weights 504. For each input word $w_i$, $K_e$ is appended at every position of the input recurrent neural network as represented in FIG. 5. Accordingly, the RNN as adapted to employ weak supervision may be expressed as $h_i = f(x_i, h_{i-1}, K_e)$. In this expression, the activation function $f(\bullet)$ is additionally dependent upon the embedded keyword list $K_e$ and corresponding keyword weights 504.

In the foregoing example, a max operation is employed to obtain the features from the group of candidate keywords. Other operations are also contemplated such as sum, which may increase the overall number of parameters in the input layer. However, with max operation, the number of keywords selected for each image may be different and a large number of potential keywords can be considered in the analysis without adding a significant number of parameters to the input layer.

As noted, various image sources 124 may be used to obtain weak supervision. data. In implementations, image sources 124 include various online repositories for images accessible over a network, such as social networking sites, image sharing sites, and curated image databases/services. Users today are frequently using such online repositories to share images and multimedia content and access image content. Images available from online sources typically include tags or short descriptions that may be leveraged to obtain weakly supervised knowledge for use in captioning.

A collection of training images used to train the image captioning framework (e.g., train the caption generator) may provide an additional or alternative source of weak supervision data 204. In this approach, the training data includes a database of images having corresponding captions used to train classifiers for the captioning model. The training image database may be relied upon as a source to discover related images that are similar to each other. Next, the captions for related images are aggregated as the weak supervised text for image captioning. When are target image is matched to a collection of related images, the captions for related images are relied upon as weak supervision data 204 for captioning of the target image.

In implementations, at least some weak supervision data 204 may be derived directly from image analysis. To do so, different concept or attribute detectors are trained to recognize the kinds of low-level image detail provided by weakly annotated images. The relatively recent development of deep neural networks has encouraged significant improvement in object recognition within images. Accordingly, it is possible to train image classifiers to recognize some types of low-level image detail such as specific objects, regional differences, image attributes, and the like. Instead of using such image details directly to generate candidate captions, the detected attributes or concepts are fed into the image caption framework as weak supervision data 204 to inform image captioning in the manner described herein.

Figure 6:
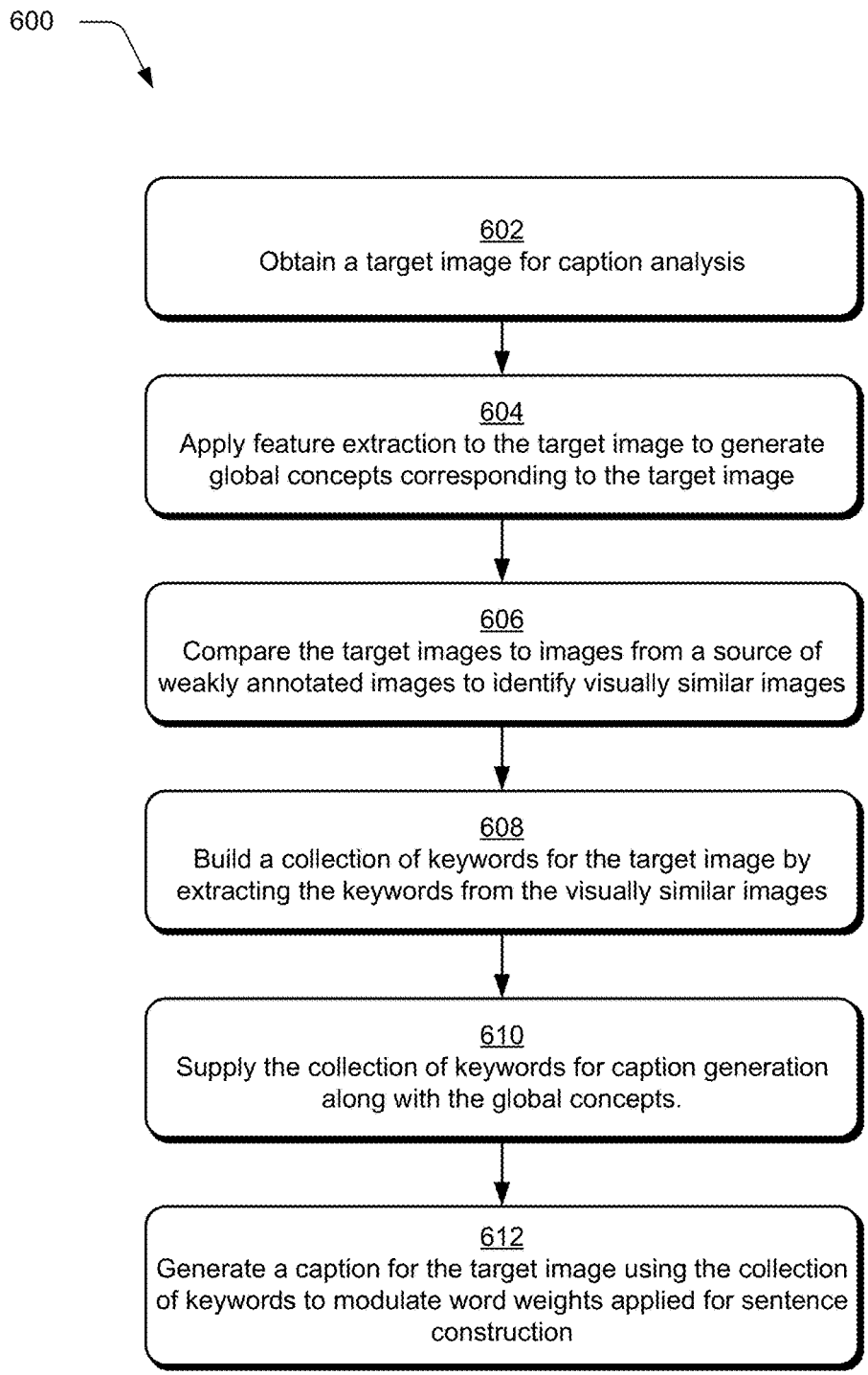
FIG. 6 is flow diagram for an example procedure in which weak supervision data is employed for image captioning in accordance with one or more implementations.

FIG. 6 is flow diagram for an example procedure 600 in which weak supervision data is employed for image captioning in accordance with one or more implementations. A target image is obtained for caption analysis (block 602). For example, an image service 120 may implement a caption generator 130 as described herein. The image service 120 may provide a searchable image database 122 that is exposed via a search API 128. The caption generator 130 is configured to perform caption analysis on images and automatically generate captions for images using various techniques described herein. Captioned images 318 generated via the caption generator 130 may be employed in various ways. For example, captions may facilitate image searches conducted via the search API 128 using natural language queries. Additionally, captions may facilitate accessibility to visually impaired user by converting the captions to audible descriptions to convey image content to the users.

To produce the image captions, feature extraction is applied to the target image to generate global concepts corresponding to the target image (block 604). Various types of feature extraction operations are contemplated. Generally, the initial feature extraction is applied to derive global concepts 404 that describe the overall gist of the image. The initial feature extraction may be performed via a CNN 402 as noted previously, although other techniques to derive global image concepts 404 are also contemplated. The derived concepts 404 may be combined to form candidate captions that are used as a starting point for further refinement and selection of a caption. Thus further refinement may additionally rely upon weak supervision data 204 as described herein.

In particular, the target image is compared to images from a source of weakly annotated images to identify visually similar images (block 606). Various sources of weakly annotated images are contemplated, examples of which were previously given. The analysis described herein relies upon at least one source, however, multiple sources may be used in some scenarios. The comparison involves using feature extraction techniques to find images that have features similar to the target image. Annotations associated with the similar images are considered relevant to captioning of the target image.

Accordingly, a collection of keywords for the target image is built by extracting the keywords from the visually similar images (block 608) and the collection of keywords is supplied for caption generation along with the global concepts (block 610). Then, a caption is generated for the target image using the collection of keywords to modulate word weights applied for sentence construction (block 612). Here, a list of keywords derived from weakly annotated images is determined and supplied as weak supervision data 204 to inform the image captioning analysis in the manner previously noted. Keyword weights 504 indicated by the weak supervision data 204 are effective to modulate weight factors applied for language modeling and sentence generation. Language modeling and sentence construction to produce captions may be implemented via an RNN 406 as described previously, although other image captioning algorithms and techniques are also contemplated. In any case, the weights reflected by weak supervision data 204 are applied for image captioning to change word probabilities in probabilistic categorization accordingly. Consequently, keywords indicative of low-level image details derived from weak annotations are considered in the captioning analysis in accordance with weight factors established for the keywords.

Word Vector Representations

Word vector representations 206 are an additional feature that may be utilized to enhance the general image captioning framework 401. Word vector representations 206 may be used individually or in combinations with weak supervision described previously and/or semantic attention discussed in the following section. Briefly, instead of outputting results of caption analysis directly as words or sequences of words (e.g., the caption or sentence), the framework 401 is adapted to output points in a semantic word vector space. These points constitute the word vector representations 206, which reflect distance values in the context of the semantic word vector space. In this approach, words are mapped into a vector space and the results of caption analysis are expressed as points in the vector space that capture semantics between words. In the vector space, similar concepts with have small distance values in word vector representations of the concepts.

In contrast, traditional approaches are designed to return predicted words or sequences. For instance, the RNN 406 described previously is traditionally configured to determine probability distributions at each node over a fixed dictionary/vocabulary. Words are scored and ranked based on the computed distribution. A most likely word is then selected as an output for each node based on the input to the node and the current state. The process iteratively finds the top caption or captions based on multiple iterations. Here, the strategy reflected by an objective function used by the RNN is solving a classification problem with each word corresponding to a class. The probability distributions are used for probabilistic classifications relative to the fixed dictionary/vocabulary. Consequently, words in the caption must be contained in the dictionary, the dictionary size is generally large to account for numerous constructions, and the analysis must be repeated entirely if the dictionary is changed.

On the other hand, with word vector representations 206, the output of the analysis is a point or points in the vector space. These points are not tied to particular words or a single dictionary. A post-processing step is employed to map the points to words and convert the word vector representations 206 to captions. Accordingly, conversion is delayed to a later stage in the process. A result of this is that the dictionary can be changed late in the process to select a different language, use a different word scope or number of words, introduce novel terms, and so forth. Additionally, the word vector representations 206 can be saved and steps completed prior to the post-processing do not have to be repeated if a change is made to the dictionary.

Figure 7:
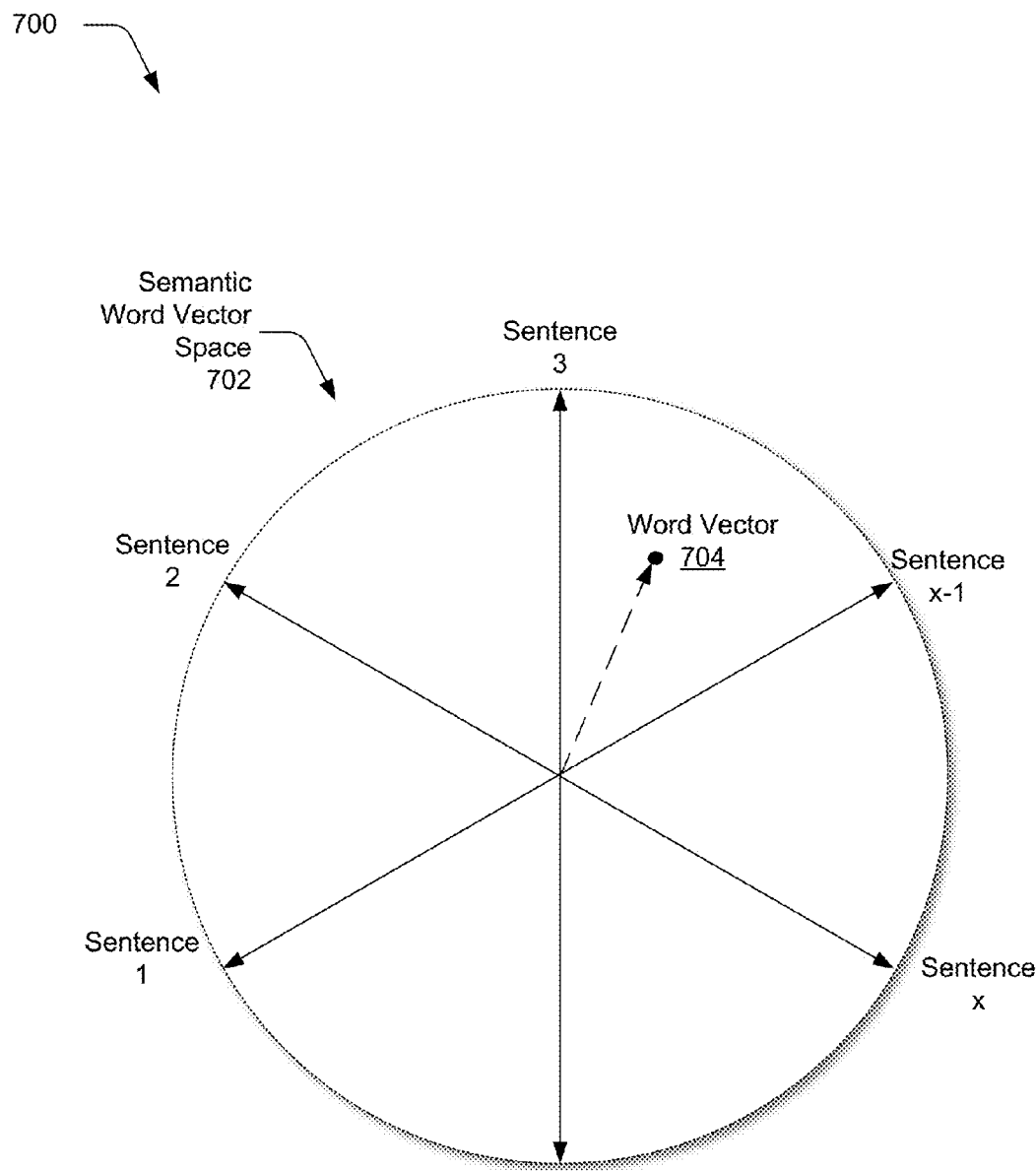
FIG. 7 depicts an example diagram that generally illustrates the concept of word vector representations for image captioning.

FIG. 7 depicts at 700 an example diagram that generally illustrates the concept of word vector representations for image captioning. In particular, FIG. 7 represents a semantic word vector space 702 that captures semantics between words. In this example, the semantic word vector space 702 has axes in a multidimensional space that correspond to different combinations of words or sentences. In this context, a word vector 704 represents distance values between words in the semantic word vector space 702. Given particular state data for an analysis problem and a selected dictionary, the word vector 704 can be mapped to the closest word or words. This approach provides flexibility to map the word vector 704 to different words late in the process in dependence upon contextual information.

Figure 8:
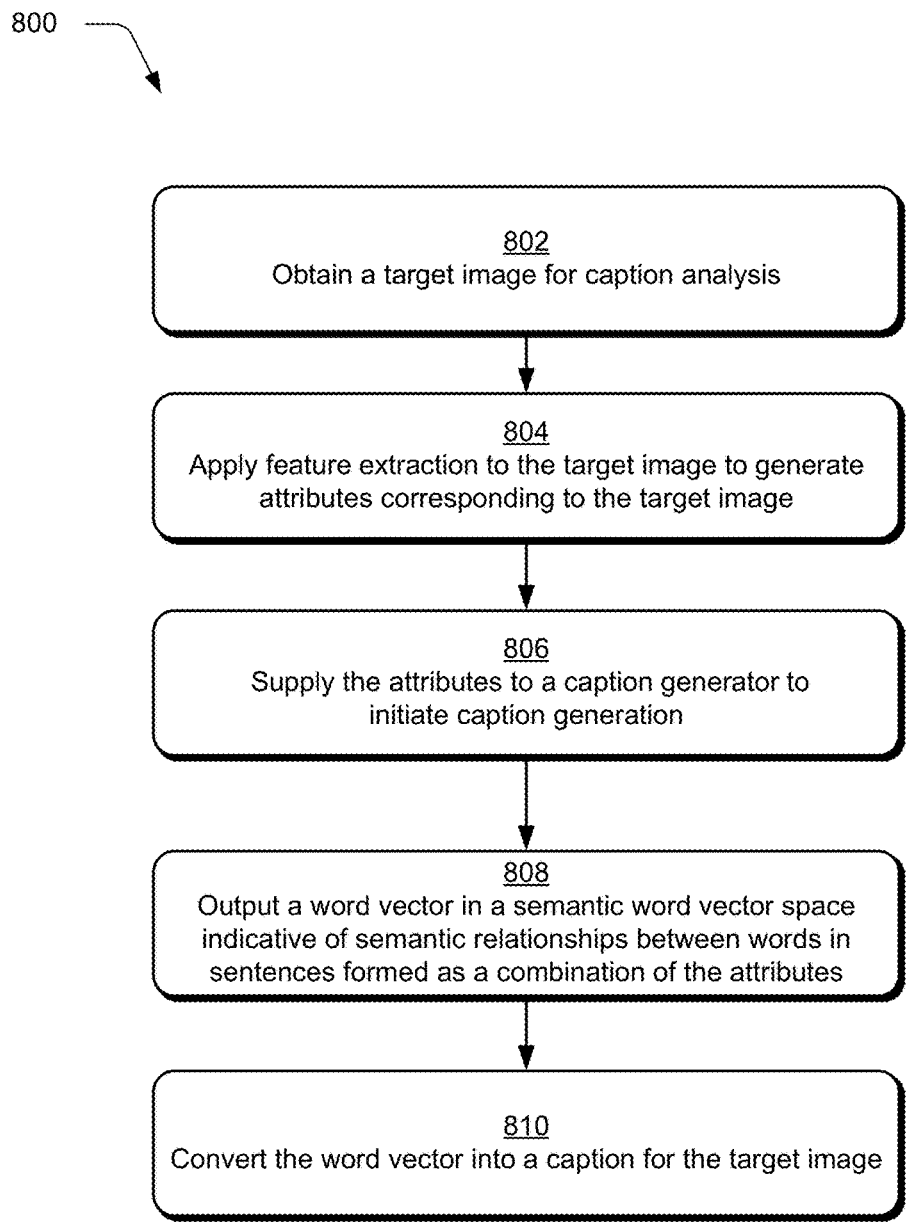
FIG. 8 is a flow diagram for an example procedure in which word vector representations are employed for image captioning in accordance with one or more implementations.

FIG. 8 is flow diagram for an example procedure 800 in which word vector representations are employed for image captioning in accordance with one or more implementations. A target image is obtained for caption analysis (bock 802) and feature extraction is applied to the target image to generate attributes corresponding to the image (block 804). For example, an image service 120 may implement a caption generator 130 configured to process images as previously described. Moreover, various types of feature extraction operations are contemplated to detect features, concepts, objects, regions and other attributes associated with the target image.

The attributes are supplied to a caption generator to initiate caption generation (block 806). For instance, attributes may be used to derive keywords that are supplied to an image analysis model 202 implemented by a caption generator 130 for image captioning. The keywords are used to construct and evaluate different combinations of keywords as potential caption candidates. As a result of the analysis, a word vector is output in a semantic word vector space indicative of semantic relationships words in sentences formed as a combination of the attributes (block 808). For instance, the image analysis model 202 may be adapted to output word vector representations 206 as intermediate results of the caption analysis. The word vector representations 206 may correspond to points in a semantic word vector space 702 that are not mapped to particular words or to a specific dictionary. For example, an objective function implemented by the RNN may be adapted to consider distances in the semantic word vector space 702 instead of probability distributions for word sequences. Some details regarding using L-2 distance and negative sampling to modify the objective function for caption analysis are discussed below.

Subsequently, the word vector is converted into a caption for the target image (block 810). Importantly, the word vector conversion is delayed to a post-processing operation that occurs following operations of the RNN to derive the word vector representations 206. In other words, the post-processing conversion is applied to output that is generated from the RNN. The word vector conversion occurs in the context of a dictionary/vocabulary that is selected outside of the caption analysis performed via the RNN. Consequently, the caption analysis to generate word vector representations 206 is not dependent upon a particular dictionary.

As noted, implementations using the semantic word vector space may be implemented using distance and/or negative sampling to modify the objective function for caption analysis. With respect to L-2 distance, the typical objective function is constructed as a probability classification problem. For example, the function may be designed to solve a log likelihood objective for a word sequence given the node input and current state. Such a log likelihood objective may be expressed as $\log p(W|V) = \Sigma_t \log p(w_t|V, w_0, w_1, \ldots, w_T)$. To enable word vector representations 206, the objective function is adapted into a cost function that depends upon distance in the semantic word vector space. For example, the adapted objective function may be expressed as $\mathrm{loss}(W|V) = \Sigma_t \delta(l_t, p_t) \mathrm{dist}(v_t, v_{p_t})$. Here $p_t$ represents the predicted word index. With this objective function, a very large vocabulary may be used. Additionally, features for each word may be initialized using some unsupervised features the adapted objective function, significantly reduce the number of features involve, because the number of parameters is related to the dimensionality of the features instead of the vocabulary size (total number of classes in the typical objective function).

The above L-2 distance approach considers the current word in the objective function at each node. However, for each node, there are many also many negative samples (all the other words). The caption analysis may be adapted further to include negative sampling analysis that accounts for the negative samples. The negative sampling injects a cost into the objective function that accounts for distance to the negative samples. With the negative sampling, the objective function is designed to minimizes distance between related words/vectors and maximize distance to the negative samples. In an implementation, for each node, N words different from the target word are randomly selected and a loss factor for the objective function is defined as $\log(1 + \exp(-w_i V h_{i-1}) + \Sigma_n \log(1 + \exp(w_n V h_{i-1}))$. In this expression, $w_i$ represents the embedding for each target word at i-th position. $w_n$ represents the n-th randomly chosen negative sample for the i-th target word and $h_{i-1}$ is the hidden response at position i-1. Thus, the negative sampling increases cost for target words when the target words are close to randomly selected negative samples.

Semantic Attention

The semantic attention model 208 is another additional feature that may be utilized to enhance the general image captioning framework 401. The semantic attention model 208 may be used individually or in combinations with weak supervision and/or word vector representations described previously. Generally, the semantic attention model 208 is implemented for selection of keywords and concepts for a corpus of available terms. The techniques discussed previously herein may employ the same set of keywords or features at each node in recurrent neural network. For example, the same keyword list derived for weak supervision data 202 may be supplied to each node in the RNN 406. However, the relevance of different words/concepts may change at different points in the analysis. The semantic attention model 208 provides a mechanism to select different concepts, keywords, or supervision information for generating the next word in dependence upon the context.

Broadly speaking, the semantic attention model 208 is configured to rank candidate keywords based on context and compute corresponding attention weights that are fed into the RNN. State information computed at each node in the RNN is fed back into the semantic attention model 208 and the candidate keywords are re-ranked according to the current context for the next iteration. Consequently, the particular keywords and weights used for each node in the RNN change as the RNN transits. As a result, the image captioning model attends to the most relevant keywords at each iteration. Using the semantic attention model 208 for image captioning enabled more complex captions and improves the accuracy of captions that are generated. Further details regarding the semantic attention model for image captioning are provided in the following discussion of FIGS. 9-11.

For context, there are two general paradigms in existing image captioning approaches: top-down and bottom-up. The top-down paradigm starts from a "gist" of an image and converts it into words, while the bottom-up one first comes up with words describing various aspects of an image and then combines them. Language models are employed in both paradigms to form coherent sentences. The state-of-the-art is the top-down paradigm where there is an end-to-end formulation from an image to a sentence based on recurrent neural networks and all the parameters of the recurrent network can be learned from training data. One of the limitations of the top-down paradigm is that it is hard to attend to fine details, which may be important in terms of describing the image. Bottom-up approaches do not suffer from this problem as they are free to operate on any image resolution. However, they suffer from other problems such as the lack of an end-to-end formulation for the process going from individual aspects to sentences.

As used herein, semantic attention for image captioning refers to the ability to provide a detailed, coherent description of semantically important objects that are relevant at different point in the captioning analysis. The semantic attention model 208 described herein is able to: 1) attend to a semantically important concept or region of interest in an image, 2) weight the relative strength of attention paid on multiple concepts, and 3) o switch attention among concepts dynamically according to task status. In particular, the semantic attention model 208 detects semantic details or "attributes" as candidates for attention using a bottom-up approach, and employs a top-down component to guide where and when attention should be activated. The model is built on top of a Recurrent Neural Network (RNN) as discussed previously. The initial state captures global concepts from the top-down component. As the RNN state transits, the model gets feedback and interaction from the bottom-up attributes via an attention mechanism enforced on both network state and output nodes. This feedback allows the algorithm to not only predict words more accurately, but also leads to more robust inference of the semantic gap between existing predictions and image content. The feedback operates to combine the visual information in both top-down and bottom-up approaches within the framework of recurrent neural networks.

Figure 9:
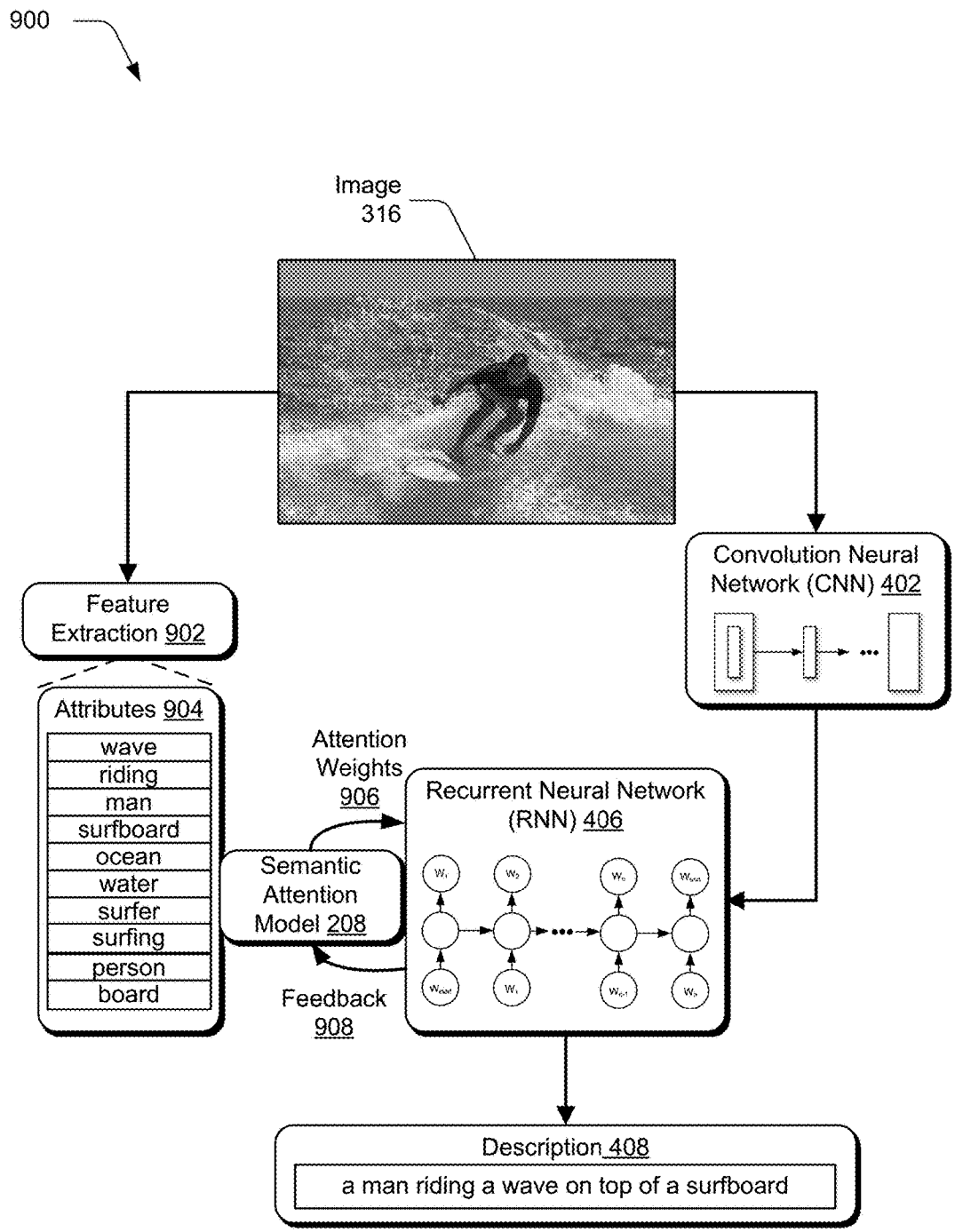
FIG. 9 is a diagram depicting a semantic attention framework for image captioning in accordance with one or more implementations.

FIG. 9 is a diagram depicting generally at 900 a semantic attention framework for image captioning in accordance with one or more implementations. As noted, the semantic attention framework combines the top-down and bottom-up approaches for image caption. In the depicted example, an image 316 is represented as a target for caption analysis. Given the target image 316, a convolutional neural network 402 is invoked to extract a top-down visual concept for the image. At the same time, feature extraction 902 is applied to detect low-level image details (regions, objects, attributes, etc.). Feature extraction 902 may be implemented as part of the same convolutional neural network 402 or using a separate extraction component. In implementations, the feature extraction 902 is applied to a source of weakly annotated images to derive weak supervision data 204 in the manner previously described. The result of feature extraction 902 is a set of image attributes 904 (e.g., keywords) corresponding to low-level image details. As represented in FIG. 9, the semantic attention model 208 operates to combine the top-down visual concept with low-level details in a RNN 406 that generates the image caption. In particular, the semantic attention model computes and controls attention weights 906 for the attributes 904 and feeds the attention weights 906 into the RNN at each iteration. As the RNN transits, the semantic attention model 208 obtains feedback 908 regarding the current state and context of the caption analysis. This feedback 908 is employed to change the attention weights for candidate attributes 904 with respect to the recurrent neural network iterations. As a result, the semantic attention model 206 causes the RNN 406 to attend to the most relevant concepts for each predictive iteration.

Figure 10:
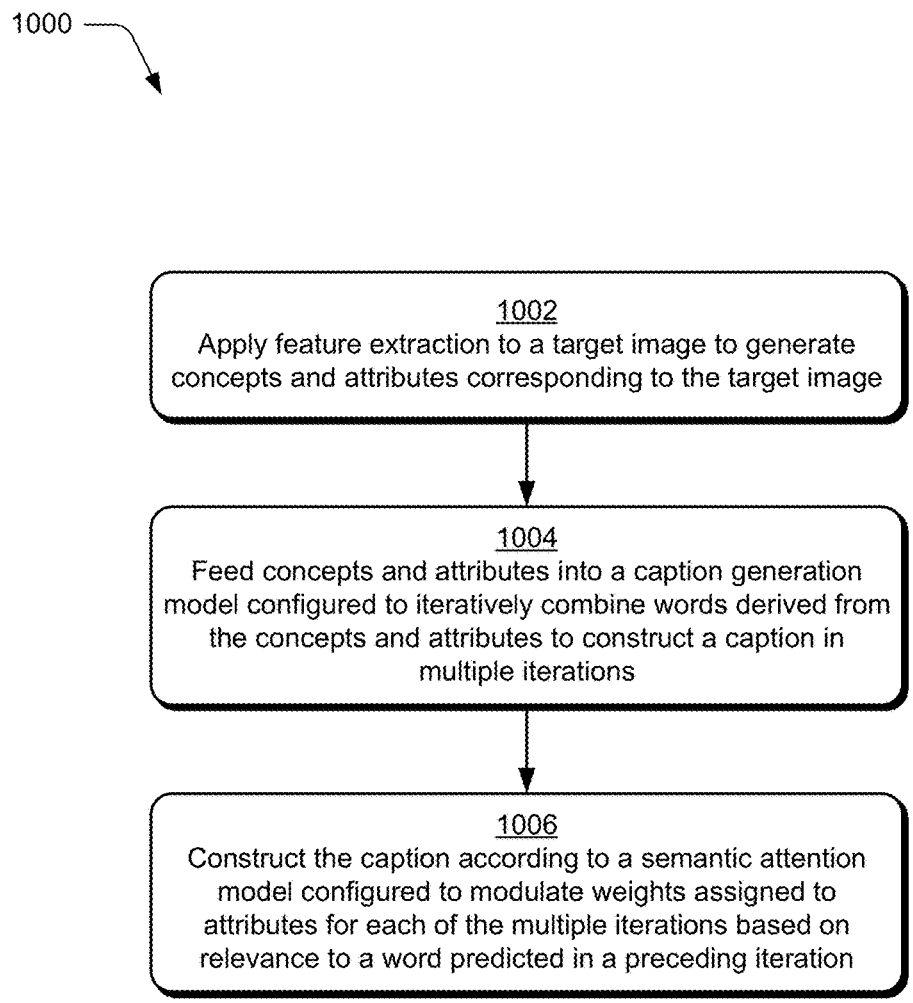
FIG. 10 is flow diagram for an example procedure in which a semantic attention model is employed for image captioning in accordance with one or more implementations.

FIG. 10 is flow diagram for an example procedure 1000 in which a semantic attention model is employed for image captioning in accordance with one or more implementations. Feature extraction is applied to a target image to generate concepts and attributes corresponding to the target image (block 1002). Feature extraction may occur in various way as described herein. The feature extraction may rely upon a CNN 402, extractor module 302, or other suitable components deigned to detect concepts and attributes for an image 316. The concepts and attributes are fed into a caption generation model configured to iteratively combine words derived from the concepts and attributes to construct a caption in multiple iterations (block 1004). Then, the caption is constructed according to a semantic attention model configured to modulate weights assigned to attributes for each of the multiple iterations based on relevance to a word predicted in a preceding iteration (block 1004). For instance, a semantic attention framework as discussed in relation to FIG. 9 may be employed for image captioning in accordance with one or more implementations. By way of example and not limitation, the semantic attention model 208 may operate in connection with a RNN 406. Alternatively, other iterative techniques for language modeling and sentence generation may be employed. In any case, the semantic attention framework supplies attention weights 906 as described herein that are used to control probabilistic classifications within the caption generation model. At each iteration, a word is predicted in a sequence for the caption using the attention weights 906 to focus the model on particular concepts and attributes that are most relevant for that iteration. The attention weights 906 are reevaluated and adjusted for each pass.

Figure 11:
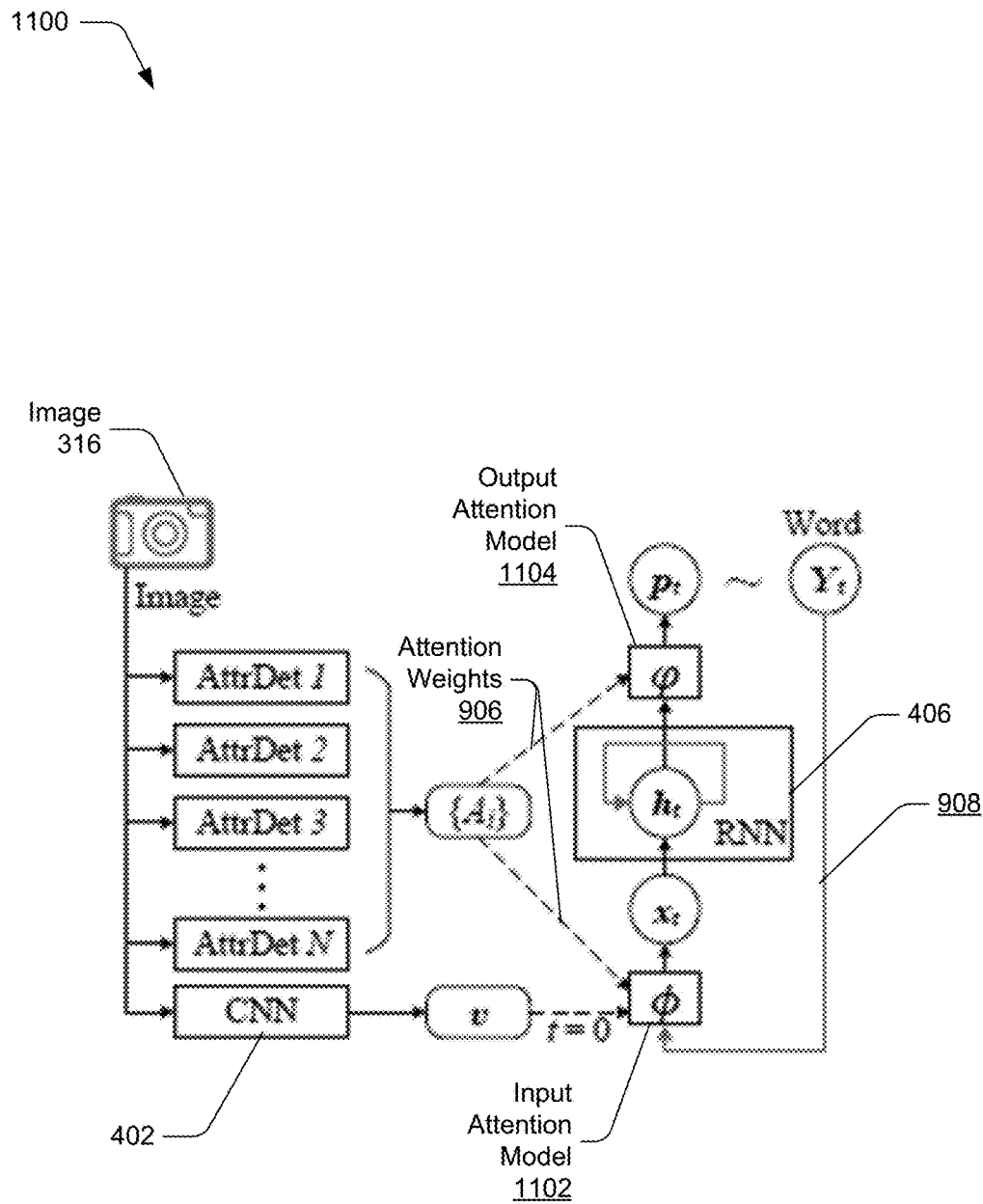
FIG. 11 is a diagram depicting details of a semantic attention framework in accordance with one or more implementations.

FIG. 11 is a diagram depicting generally at 1100 details of a semantic attention framework in accordance with one or more implementations. In particular, FIG. 11 represents an example image captioning framework that utilizes both an input attention model 1102 represented by $\phi$ and an output attention model 1104 represented by go, details of which are described below. In the framework, attributes 904 are derived for an image 316. In addition, a CNN 402 is employed to derive visual concepts for the image 316 represented by v. The attributes 904 coupled with corresponding attribute weights 906 are represented as attribute detections $\{A_i\}$. The visual concepts v and attribute detections $\{A_i\}$ are injected into RNN (dashed arrows) and get fused together through a feedback 908 loop. Within this framework, attention on attributes is enforced by both the input attention model 1102 ($\phi$) and the output attention model 1104 ($\phi$).

Accordingly both top-down and bottom-up features are obtained from the input image. In an implementation, intermediate filer responses from a classification Convolutional Neural Network (CNN) are used to build the global visual concept denoted by v. Additionally, a set of attribute detectors operates to get the list of visual attributes $\{A_i\}$ that are most likely to appear in the image. Each attribute $A_i$ corresponds to an entry in the vocabulary set or dictionary Y.

All the visual concepts and features are fed into a Recurrent Neural Network (RNN) for caption generation. As the hidden state $h_t \in R^n$ in RNN evolves over time t, the t-th word $Y_t$ in the caption is drawn from the dictionary Y according to a probability vector $p_t \in R^{|Y|}$ controlled by the state $h_t$. The generated word $Y_t$ will be fed back into RNN in the next time step as part of the network input $x_{t+1} \in R^m$, which drives the state transition from $h_t$ to $h_{t-1}$. The visual information from v and $\{A_i\}$ serves as an external guide for RNN in generating $x_t$ and $p_t$, which is specified by input and output models $\phi$ and $\varphi$ represented in FIG. 11.

In contrast to previous image captioning approaches, the framework utilizes and combines different sources of visual information using the feedback 908 loop. The CNN image concept(s) v is used as the initial input node $x_0$, which is expected to give RNN a quick overview of the image content. Once the RNN state is initialized to encompass the overall visual context, the RNN is able to select specific items from $\{A_i\}$ for task-related processing in the subsequent time steps. Specifically, the framework is governed by the equations:

$$x_0 = \phi_0(v) = W^{x,v}v$$

$$h_t = f(x_t, h_{t-1})$$

$$Y_t \sim p_t = \varphi(h_t, \{A_i\})$$

$$x_t = \phi(Y_{t-1}, \{A_i\}), t > 0,$$

Here, a linear embedding model is used for the initial input node $x_0$ with a weight factor indicated by $W^{x,v}$. The input attention model $\phi$ is applied to v at t=0 to embed the global concept(s). $h_t$ represents state for hidden nodes of the RNN, which are governed by the activation function $f$ as previously described. The input $\phi$ and output $\varphi$ attention models are designed to adaptively attend to certain cognitive cues in $\{A_i\}$ based on the current model status, so that the extracted visual information will be most relevant to the parsing of existing words and the prediction of future words. For example, the current word $Y_t$ and probability distribution $p_t$ depend upon the output $\varphi$ model and attribute weights as reflected by the expression $Y_t \sim p_t = \varphi(h_t, \{A_i\})$. Likewise, the input after t=0 is expressed by $x_t = \phi(Y_{t-1}, \{A_i\})$, t>0, and depends upon the input $\phi$ model, the word predicted in a preceding iteration $Y_{t-1}$ and the attributes $\{A_i\}$. The RNN operates recursively and as such the attended attributes are fed back to state $h_t$ and integrated with the global information represented by v.

In the input attention model $\phi$ for t>0, a score $\alpha_t^i$ is assigned to each detected attribute $A_i$ based on its relevance with the previous predicted word $Y_{t-1}$. Since both $Y_{t-1}$ and $A_i$ correspond to an entry in dictionary Y, they can be encoded with one-hot representations in $R^{|Y|}$ space, which we denote as $y_{t-1}$ and $y^i$ respectively. As a common approach to model relevance in vector space, a bilinear function is used to evaluate $\alpha_t^i$. In particular, $\alpha_t^i \propto \exp(y_{t-1}^T \tilde{U} y^i)$, where the exponent is taken to normalize over all the $\{A_i\}$ in a softmax fashion. The matrix $\tilde{U} \in R^{|Y| \times |Y|}$ contains a huge number of parameters for any Y with a reasonable vocabulary size. To reduce parameter size, the one-hot representations can be projected into a low dimensional semantic word vector space (as discussed in relation to FIGS. 7 and 8 above).

Let the word embedding matrix be $E \in R^{d \times |Y|}$ with $d \ll |Y|$. Then, the preceding bilinear function becomes $\alpha_t^i \propto \exp(y_{t-1}^T E^T U E y^i)$, where U is a d×d matrix. Once calculated, the attention scores are used to modulate the strength of attention on different attributes. The weighted sum of all attributes is mapped from the word embedding space to the input space of $x_t$ together with the previous word in accordance with the expression: $x_t = W^{x,Y}(E_{y_{t-1}} + \text{diag}(w^{x,A})\Sigma_i \alpha_t^i E y^i)$. Here, $W^{x,Y} \in R^{m \times d}$ is the projection matrix, diag(w) denotes a diagonal matrix constructed with vector w, and $w^{x,A} \in R^d$ models the relative importance of visual attributes in each dimension of the semantic word vector space.

The output attention model $\varphi$ is designed similarly to the input attention model. However, a different set of attention scores are calculated since visual concepts may be attended in different orders during the analysis and synthesis processes of a single sentence. In other words, weights used for input and output models are computed separately and have different values. With all the information useful for predicting $Y_t$ captured by the current state $h_t$, the score $\beta_t^i$ for each attribute $A_i$ is measured with respect to $h_t$, which is captured by the expression $\beta_t^i \propto \exp(h_t^T V \sigma(E y^i))$. Here, $V \in R^{n \times d}$ is the bilinear parameter matrix. σ denotes the activation function connecting the input node to the hidden state in RNN, which is used here to ensure the same nonlinear transform is applied to the two feature vectors before they are compared.

Again, $\beta_t^i$ are used to modulate the attention on all the attributes, and the weighted sum of their activations is used as a compliment to $h_t$ in determining the distribution $p_t$. Specifically, the distribution is generated by a linear transform followed by a softmax normalization expressed as $p_t \propto \exp(E^T W^{Y,h}(h_t + \text{diag}(w^{Y,A})\Sigma_i \beta_t^i \sigma(E y^i)))$. In this expression, $W^{Y,h} \in R^{d \times n}$ is the projection matrix and $w^{Y,A} \in R^n$ models the relative importance of visual attributes in each dimension of the RNN state space. The $E^T$ term implements a transposed weight sharing trick for parameter reduction.

The training data for each image consist of input image features v, $\{A_i\}$ and output caption words sequence $\{Y_t\}$. For model learning, the goal is to learn all the attention model parameters $\Theta_A = \{U, V, W^*,^*, w^*,^*\}$ jointly with all RNN parameters $\Theta_R$ by minimizing a loss function over the training set. The loss of one training example is defined as the total negative log-likelihood of all the words combined with regularization terms on attention scores $\{\alpha_t^i\}$ and $\{\beta_t^i\}$ and expressed according to the following loss function:

$$\min_{\Theta_A, \Theta_R} -\Sigma_t \log p(Y_t) + g(\alpha) + g(\beta).$$

Here, α and β are attention score matrices with their (t; i)-th entries being the weights $\alpha_t^i$ and $\beta_t^i$. The regularization function g is used to enforce the completeness of attention paid to every attribute in $\{A_i\}$ as well as the sparsity of attention at any particular time step. This is done by minimizing the following matrix norms for α (and the same for β):

$$g(\alpha) = \|\alpha\|_{1,p} + \|\alpha^T\|_{q,1} = \left[\sum_i \left[\sum_t \alpha_t^i\right]^p\right]^{\frac{1}{p}} + \sum_t \left[\sum_i (\alpha_t^i)^q\right]^{\frac{1}{q}}$$

The first term with p>1 penalizes excessive attention paid to any single attribute $A_i$ accumulated over the entire sentence, and the second term with 0<q<1 penalizes diverted attention to multiple attributes at any particular time. A stochastic gradient descent algorithm with an adaptive learning rate is employed to optimize the loss function.

Having considered the forgoing example details, procedures, user interfaces and examples, consider now a discussion of an example system including various components and devices that can be employed for one or more implementations of image captioning techniques described herein.

Example System and Device

Figure 12:
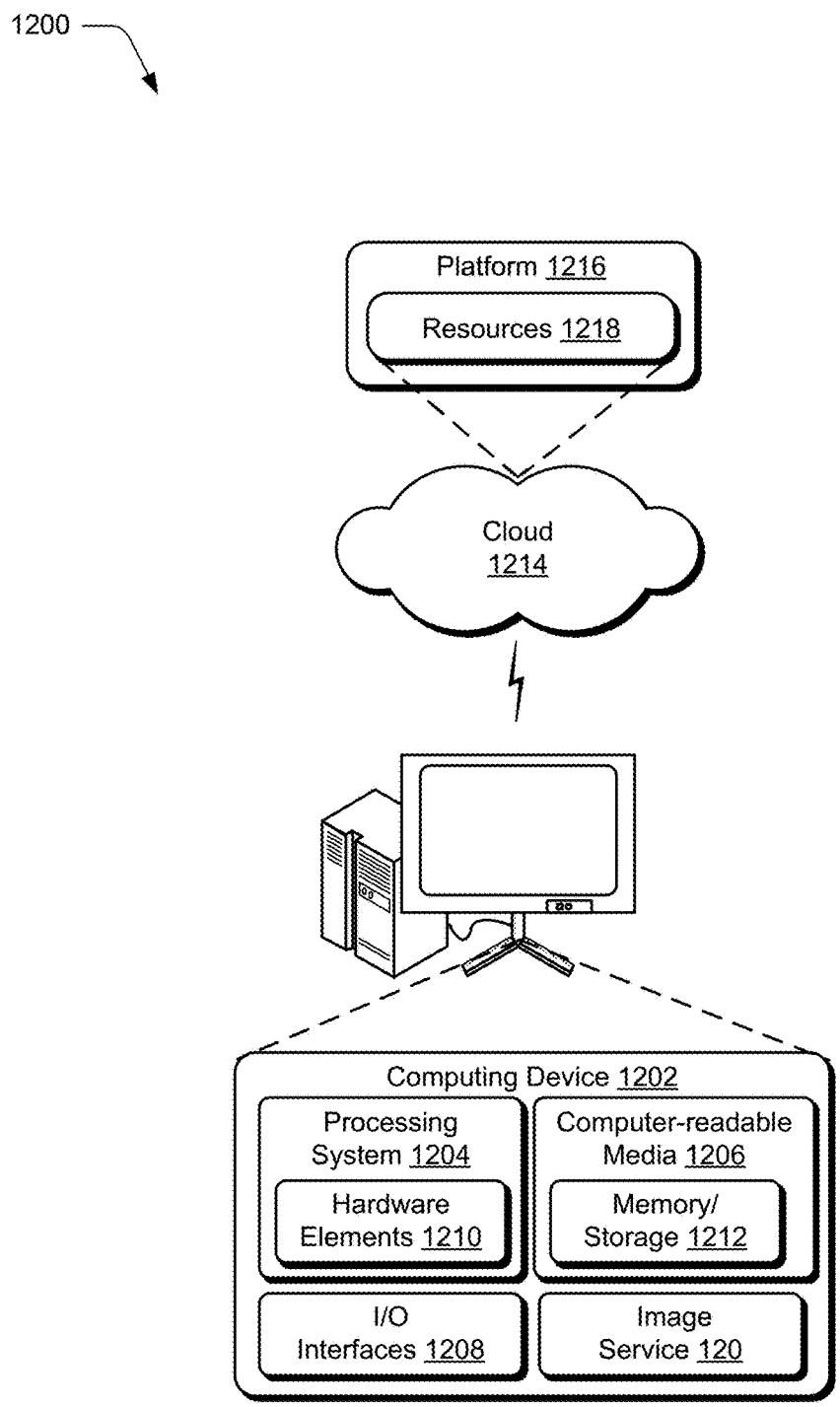
FIG. 12 illustrates an example system including various components of an example device that can be employed for one or more implementations of image captioning techniques described herein.

FIG. 12 illustrates an example system generally at 1200 that includes an example computing device 1202 that is representative of one or more computing systems and/or devices that may implement the various techniques described herein. This is illustrated through inclusion of the image service 120, which operates as described above. The computing device 1202 may be, for example, a server of a service provider, a device associated with a client (e.g., a client device), an on-chip system, and/or any other suitable computing device or computing system.

The example computing device 1202 is illustrated as including a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In a digital media environment to facilitate management of image collections using one or more computing devices, a method to automatically generate image captions using word vector representations comprising:
   obtaining a target image for caption analysis;
   applying feature extraction to the target image to generate attributes corresponding to the image;
   supplying the attributes to a caption generator to initiate caption generation; and
   outputting by the caption generator a word vector in a semantic word vector space indicative of semantic relationships between words in sentences formed as a combination of the attributes, the word vector usable to generate a corresponding caption.

2. The method as described in claim 1, further comprising converting the word vector into a caption for the target image as a post-processing operation.

3. The method as described in claim 2, wherein converting the word vector into a caption for the target image comprises selecting a dictionary and mapping the word vector to words in the semantic word vector space based on the selected dictionary.

4. The method as described in claim 1, wherein the caption generator is configured to generate word vectors as intermediate results of caption analysis.

5. The method of claim 1, wherein the feature extraction is implemented using a pre-trained convolution neural network (CNN) to encode the image with keywords indicative of the attributes.

6. The method of claim 1, wherein supplying the attributes to a caption generator to initiate caption generation comprises providing the attributes to a recurrent neural network (RNN) designed to implement language modeling and sentence construction techniques for generating a caption for the target image.

7. The method of claim 6, wherein an objective function implemented by the RNN is adapted to consider distances in the semantic word vector space instead of probability distributions for word sequences.

8. The method of claim 6, wherein word vector conversion is delayed to a post-processing operation performed after operations of the RNN occur to output the word vector.

9. The method of claim 6, wherein the word vector conversion occurs in the context of a dictionary selected outside of the caption analysis performed via the RNN.

10. The method of claim 1, wherein the word vector is usable to generate a corresponding caption with multiple different dictionaries selected after the word vector is generated.

11. In a digital media environment to facilitate access to collections of images using one or more computing devices, a system comprising;
   one or more processing devices;
   one or more computer-readable media storing instructions executable via the one or more processing devices to implement a caption generator configured to perform operations to automatically generate image captions using word vector representations including:
      obtaining a target image for caption analysis;
      applying feature extraction to the target image to generate attributes corresponding to the image;
      supplying the attributes to the caption generator to initiate caption generation;
      outputting by the caption generator a word vector in a semantic word vector space indicative of semantic relationships between words in sentences formed as a combination of the attributes; and
      subsequently using the word vector in post-processing operations to generate a corresponding caption by:
         selecting a dictionary; and
         mapping the word vector to words in the semantic word vector space based on the selected dictionary.

12. A system as recited in claim 11, wherein outputting the word vector in the semantic word vector space enables changing of the selected dictionary for different contexts.

13. A system as recited in claim 11, wherein the feature extraction is implemented using a pre-trained convolution neural network (CNN) to encode the image with keywords indicative of the attributes.

14. A system as recited in claim 11, wherein supplying the attributes to a caption generator to initiate caption generation comprises providing the attributes to a recurrent neural network (RNN) designed to implement language modeling and sentence construction techniques for generating a caption for the target image.

15. A system as recited in claim 14, wherein an objective function implemented by the RNN is adapted to consider distances in the semantic word vector space instead of probability distributions for word sequences.

16. One or more non-transitory computer-readable storage media storing instructions executable via the one or more processing devices to implement a caption generator configured to perform operations to automatically generate image captions using word vector representations including:
 obtaining a target image for caption analysis;
 applying feature extraction to the target image to generate attributes corresponding to the image;
 supplying the attributes to the caption generator to initiate caption generation;
 outputting by the caption generator a word vector in a semantic word vector space indicative of semantic relationships between words in sentences formed as a combination of the attributes; and
 subsequently using the word vector in post-processing operations to generate a corresponding caption by:
  selecting a dictionary; and
  mapping the word vector to words in the semantic word vector space based on the selected dictionary.

17. One or more non-transitory computer-readable storage media as recited in claim 16, wherein outputting the word vector in the semantic word vector space enables changing of the selected dictionary for different contexts.

18. One or more non-transitory computer-readable storage media as recited in claim 16, wherein the feature extraction is implemented using a pre-trained convolution neural network (CNN) to encode the image with keywords indicative of the attributes.

19. One or more non-transitory computer-readable storage media as recited in claim 16, wherein supplying the attributes to a caption generator to initiate caption generation comprises providing the attributes to a recurrent neural network (RNN) designed to implement language modeling and sentence construction techniques for generating a caption for the target image.

20. One or more non-transitory computer-readable storage media as recited in claim 19, wherein an objective function implemented by the RNN is adapted to consider distances in the semantic word vector space instead of probability distributions for word sequences.

* * * * *